Dec. 20, 1927.  
C. A. INGERSOLL  
1,653,399  
TRANSMISSION BAND  
Filed March 26, 1925

INVENTOR:  
Charles A. Ingersoll,  
BY Arthur B Jenkins,  
ATTORNEY.

Patented Dec. 20, 1927.

1,653,399

UNITED STATES PATENT OFFICE.

CHARLES A. INGERSOLL, OF PORTLAND, CONNECTICUT, ASSIGNOR TO THE RUSSELL MANUFACTURING COMPANY, OF MIDDLETOWN, CONNECTICUT, A CORPORATION OF CONNECTICUT.

TRANSMISSION BAND.

Application filed March 26, 1925. Serial No. 18,442.

My invention relates to the class of devices that are commonly employed in connection with rotating members, more especially of the transmission mechanism of vehicles, to retard rotation of such members, and an object of my invention, among others, is the provision of a band that may be readily placed in position and that shall be of maximum strength sufficient to effectually withstand the forces to which it may be subjected in use.

One form of transmission band embodying my invention and in the construction and use of which the objects herein set out, as well as others, may be attained, is illustrated in the accompanying drawings, in which—

Figure 1:
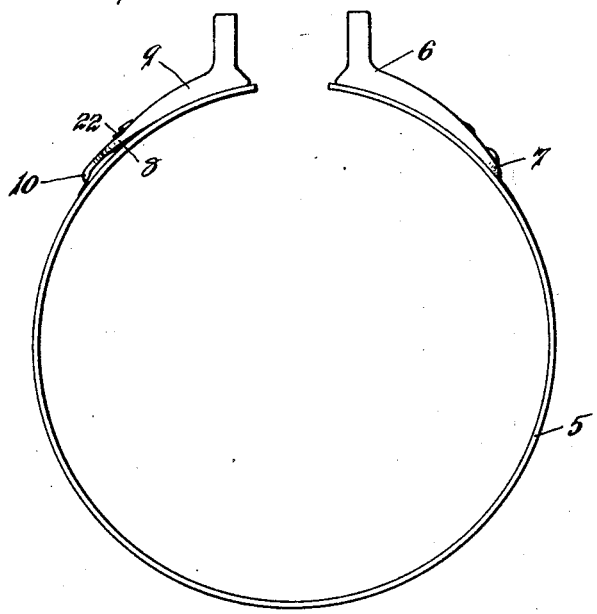
Figure 1 is an edge view of a transmission band embodying my invention.

It has heretofore been proposed to construct a transmission band so that it may be placed in position thru the opening in the upper portion of the transmission case of the propelling mechanism of a vehicle, a common example of such a transmission case being present in the well known Ford type of automobile, and to effect this purpose it has been common practice to remove the ear or lug at one end of the ring in order that such ring may be readily "threaded" through the opening above mentioned and around one of the drums of the transmission system, the removed ear or lug then being secured in place. As much force is applied to the lugs at the ends of such rings or bands it becomes essential that the means for removably securing the ear or lug in place shall be such as to prevent the lug from being torn from its fastening in the application of forces applied to the lug in effecting the operation of the hand.

My invention embodies a transmission band including a ring provided with simple and effective means for securely attaching the lug in place, such means being shown in the drawings herein in which the numeral 5 indicates the ring portion of a transmission band, preferably formed from a single piece or strip of flat material to one end of which a lug or ear 6 is permanently secured, as by means of rivets or other fastenings extending through the base 7 of the lug or ear.

The base 8 of the removable lug 9 is suitably secured at one end to the ring or band in any desired manner, in the form of construction herein shown a hook 10 integral with the base being engaged within a hole 11 in the ring, and a screw 12 is employed for fastening the opposite end of the base to the ring.

Figure 2:
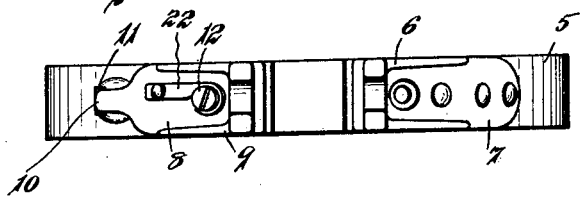
Figure 2 is a plan view of the same in central longitudinal section.
Figures 3, 4:
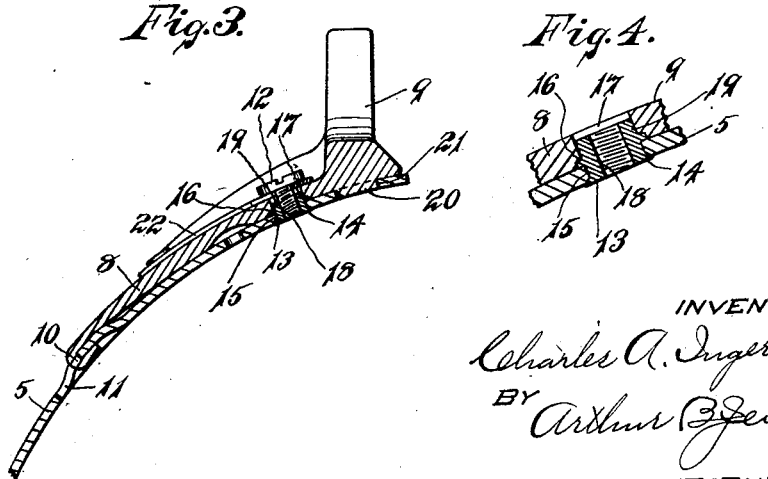
Figure 3 is an enlarged detail view through said band.
Figure 4 is a fragmentary view on enlarged scale showing the construction of the bushing.

This ring or band 5, in order to secure the best results, is formed comparatively thin, too thin in fact to enable enough thread to be obtained to afford a strong fastening for the screw 12. I, therefore, provide means that will enable a proper amount of threaded surface to be obtained to securely retain the screw under all conditions in the ordinary use of the band. This improved means comprises a threaded bushing 13 having a head 14 preferably located in a countersunk portion of a hole 15 through the ring, this countersunk portion of the hole being in the under surface of the ring, and as shown in Figure 2 of the drawings. A flange 16 is formed in any suitable manner on the side of the bushing at the outer surface of the ring to secure said bushing in place, the end of the bushing being extended beyond this flange and beyond the outer surface of the ring, such projecting end fitting a hole 17 in the base 8 of the removable lug, and as shown in Figure 4 of the drawings. A threaded hole 18 is formed through the bushing for reception of the screw 12, and it will be seen that this hole may be of such depth as to provide a proper amount of screw thread to securely retain the screw 12 in place and thereby afford a strong attachment for the base of the lug 9.

The projecting end of the bushing provides a hub 19 that engages within the hole 17 in the base, thereby securing said base from sliding movement on the ring and the greatest force on the ring in use being directed toward the end thereof, the hook 10 aids in preventing sliding movement of the lug on the ring.

The bushing being formed of a piece of metal separate from the band affords a comparatively inexpensive means for obtaining the required amount of screw threaded surface for engagement of the screw 12, and moreover, as said ring or band is commonly heat-treated in a tempering process the bushing may be secured in place after such heat treatment and the threads are not, therefore, subject to change or distortion as would be the case were they subjected to the heated conditions in said tempering process.

As an additional means for retaining the base 8 of the lug 9 against sliding movement on the ring under forces applied to the lug a stud 20 may be provided on the base to project into a hole 21 in the ring, but the provision of such stud is purely a matter of choice. A locking spring 22 may be employed, if desired, for the purpose of restraining loosening movement of the screw 12.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A transmission band comprising a ring, a bushing formed from a piece of metal separate from said ring and secured thereto and having a flange resting against said ring, and a head to secure it to said ring, said bushing having a threaded hole, a lug comprising a base, means for removably securing one end of the base to said ring, and a screw projecting through the base and engaging the threaded hole in said bushing to removably secure the opposite end of the base to the ring.

2. A transmission band comprising a ring, a bushing formed from a piece of metal separate from said ring and having a flange resting against one surface of the ring and a head to secure the bushing to the ring, said bushing having a threaded hole, a lug comprising a base, a hook on one end of the base engaged within a hole on the ring to removably secure this end of the base to the ring, and a screw projecting through the base and engaging the threaded hole in said bushing to removably secure the other end of the base to the ring.

CHARLES A. INGERSOLL.